(12) United States Patent
Fischer et al.

(10) Patent No.: US 7,237,978 B2
(45) Date of Patent: Jul. 3, 2007

(54) JOINT SEALING BELLOWS WITH SEALING RING AND ASSEMBLY/INSTALLATION METHOD

(75) Inventors: Markus Fischer, Northville, MI (US); Eric Holmes, Ann Arbor, MI (US); Daniel Dearing, Northville, MI (US)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 10/896,497

(22) Filed: Jul. 22, 2004

(65) Prior Publication Data
US 2006/0018707 A1  Jan. 26, 2006

(51) Int. Cl.
*F16J 15/32* (2006.01)
*F16C 11/06* (2006.01)

(52) U.S. Cl. .......... 403/50; 403/51; 403/134; 277/635; 464/175

(58) Field of Classification Search ........ 403/50, 403/51, 134, 288; 277/634–636, 641; 464/175
See application file for complete search history.

(56) References Cited

U.S. PATENT DOCUMENTS 4,154,546 A * 5/1979 Merrick et al. ......... 403/134
4,220,418 A * 9/1980 Kondo et al. ............ 403/76
5,005,808 A * 4/1991 Warmuth et al. ...... 267/64.27
6,220,969 B1 * 4/2001 Lilley .................... 464/173
6,350,075 B1   2/2002 Abels .................... 403/134
6,644,883 B2 * 11/2003 Davis .................... 403/122
6,648,340 B2 * 11/2003 Yagyu .................... 277/634
2004/0096264 A1 * 5/2004 Abels ..................... 403/134

FOREIGN PATENT DOCUMENTS

| DE | 199 10 689 | 11/2000 |
|---|---|---|
| DE | 199 21 952 | 11/2000 |
| DE | 102 07 779 | 10/2003 |
| EP | 1 035 337 | 9/2000 |
| EP | 1 052 418 | 11/2000 |

OTHER PUBLICATIONS

Patent Abstracts of Japan vol. 1998, No. 13; Nov. 30, 1998.*

* cited by examiner

*Primary Examiner*—Daniel P. Stodola
*Assistant Examiner*—Joshua T. Kennedy
(74) *Attorney, Agent, or Firm*—McGlew and Tuttle P.C.

(57) ABSTRACT

A ball and socket joint bellows seal is provided with a ball pivot pin with a connection piece, a bellows with an annular engagement surface with a sliding ring groove and a bellows seal element. The bellows seal element has a connection piece sealing face statically engaged with said connection piece, a radially extending sealing portion and a sliding ring portion connected to said radially extending sealing portion and extending into the sliding ring groove.

7 Claims, 6 Drawing Sheets

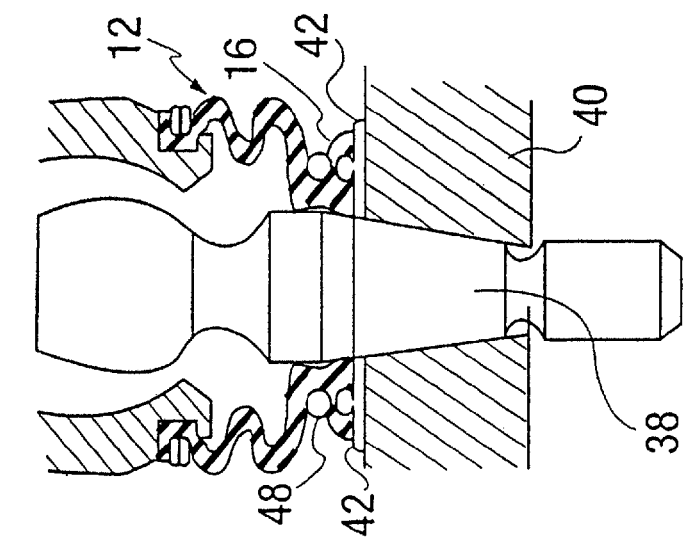
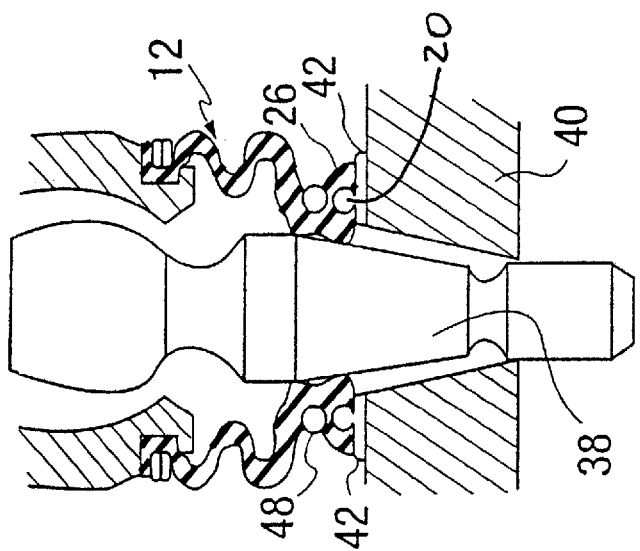
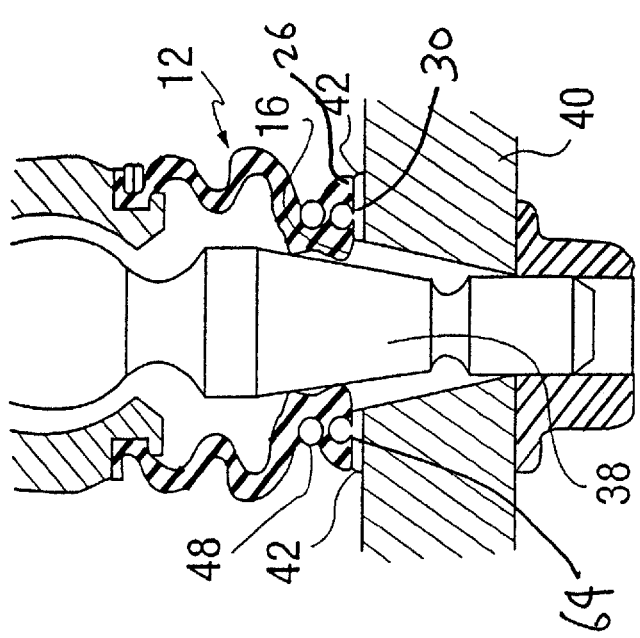

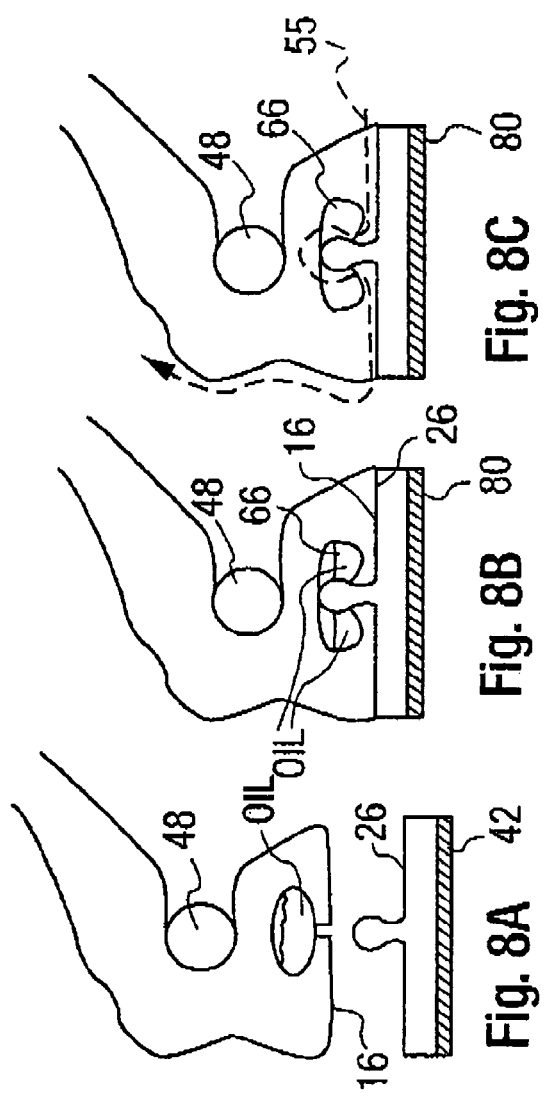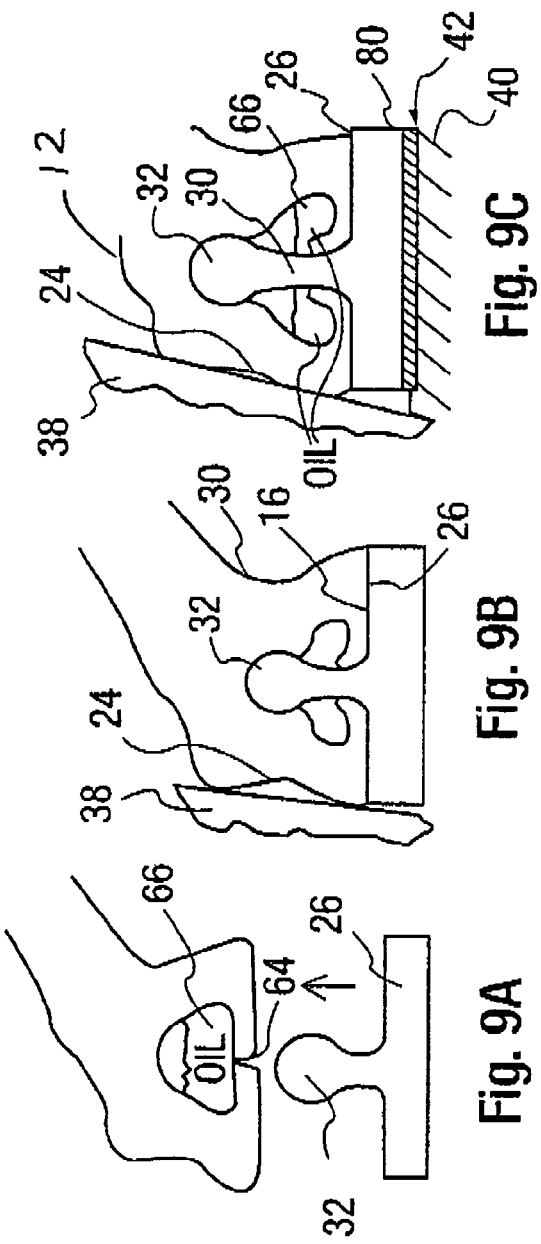

JOINT SEALING BELLOWS WITH SEALING RING AND ASSEMBLY/INSTALLATION METHOD

FIELD OF THE INVENTION

The present invention relates generally to ball and socket joints and more particularly to a ball and socket joint sealing bellows and a ball and socket joint assembly with a bellows or sealing boot to ball stud (ball pin) connection and to a sealing boot.

BACKGROUND OF THE INVENTION

Ball and socket joins are known that have a sealing boot connected at one end to a housing of the ball joint and connected at another end to a ball stud (ball pin) and/or a knuckle (the connected piece or mating part—connected to the ball pin). The end of the sealing boot is either directly applied to the ball stud or knuckle or is applied by the use of a sealing ring.

Sealing rings are known that apply pressure to a bellows to urge it into engaging with the ball pin or knuckle or to form an engagement surface to facilitate the sealing of the sealing boot relative to the ball pin or knuckle. Such sealing rings are difficult to form and use radial press fit to define a sealing surface. The parts must be handled very carefully to avoid damage or handling marks. After the parts are pressed on they cannot adjust with regard to axial length if the knuckle has to be changed. An axial seal to the knuckle is not present.

SUMMARY OF THE INVENTION

It is an object of the invention to provide an easy assembly of a sealing boot (bellows seal) to ball and socket joint parts that presents a good seal, particularly in an axial direction of the sealing boot, knuckle (connected part) and stud (pin) interface.

According to the invention a ball and socket joint bellows seal is provided with a ball pivot pin with a connection piece, a bellows with an annular engagement surface with a sliding ring groove and a bellows seal element. The bellows seal element has a connection piece sealing face statically engaged with said connection piece, a radially extending sealing portion and a sliding ring portion connected to said radially extending sealing portion and extending into the sliding ring groove.

The radially extending sealing portion may provide a static engagement with the connection piece. With this an axial seal is provided and the sliding ring portion slides in the ring groove. The radially extending sealing portion may be fixed to the connection piece.

The sliding ring groove may have a widened portion spaced axially inwardly of the substantially radially extending engagement surface. The sliding ring portion may have a widened portion spaced axially inwardly of the radially extending sealing portion.

Lubricant may be disposed in the sliding ring groove. The substantially radially extending engagement surface may have a lubricant retaining portion defined by one of a narrowed gap and a material barrier at an entrance of the sliding ring groove. The lubricant retaining portion then acts to retain at least a portion of the lubricant in the sliding ring groove in a pre-assembly state prior to the sliding ring portion being inserted into the widened portion of the sliding ring groove and to form a seal in a state with the sliding ring portion inserted into the widened portion of the sliding ring groove with an amount of lubricant at each of two sealing sides of the widened portion. The annular engaging surface may extend substantially in a radial direction with respect to the connection piece.

The bellows seal element may have a pivot pin sealing surface engaged with the pivot pin. A clamping ring acting on an outside of the bellows may be provided to apply force to the bellows such that the pivot pin sealing surface statically engages with the pivot pin.

According to another aspect of the invention, a process is provided for forming a ball and socket joint. The process includes providing a ball pivot pin seated in a ball joint housing and providing a connection part with a radially extending surface having an opening for receiving the ball pivot pin. A bellows is provided with a first connection end with an annular housing connection surface and another end with an annular engagement surface having a sliding ring groove. The bellows is connected to the housing. A bellows seal element is with a connection piece sealing face, a radially extending sealing portion and a sliding ring portion connected to the radially extending sealing portion. The radially extending sealing portion of the bellows seal element is connected to the connection part radially extending surface. The ball pivot pin is moved into the opening of the connection part. The sliding ring portion is inserted into the sliding ring groove.

According to still another aspect of the invention, a sealing boot is provided comprising a bellows with an annular engagement surface with a sliding ring groove and a bellows seal element with a connection piece sealing face to statically engage with a joint connection part, a radially extending sealing portion and a sliding ring portion connected to the radially extending sealing portion and extending into the sliding ring groove.

The sliding ring groove may have a widened portion spaced axially inwardly of the substantially radially extending engagement surface. A lubricant may be disposed in the sliding ring groove.

The slipping ring may have plural slipping ring portions, arranged concentrically and coaxial to engage in corresponding concentric and coaxial grooves of the bellows element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 7A is a sectional view showing a state of assembly with the sealing boot contacting the slipping ring;

FIG. 7B is a sectional view showing another state of assembly as the ball pin advances with respect to the connection piece;

FIG. 7C is a sectional view showing the assembled state;

FIG. 8A is an enlarged sectional view showing the sealing boot and sliding ring in a pre-assembly state, relatively positioned for engagement;

FIG. 8B is an enlarged sectional view showing the sealing boot and sliding ring in an assembled state;

FIG. 8C is an enlarged sectional view showing the sealing boot and sliding ring in an assembled state illustrating the axial seal (sealing in an axial direction to prevent water ingress in a radial direction);

FIG. 9A is an enlarged sectional view showing a state of the sealing boot and the sliding ring assembly process with an embodiment not using a clamping ring;

FIG. 9B is an enlarged sectional view showing another state of the sealing boot and sliding ring assembly process;

FIG. 9C is an enlarged broken away sectional view showing the assembled state of sealing boot and sliding ring with pin and knuckle according to the embodiment of FIG. 9A;

DESCRIPTION OF THE PREFERRED EMBODIMENT

Figure 1:
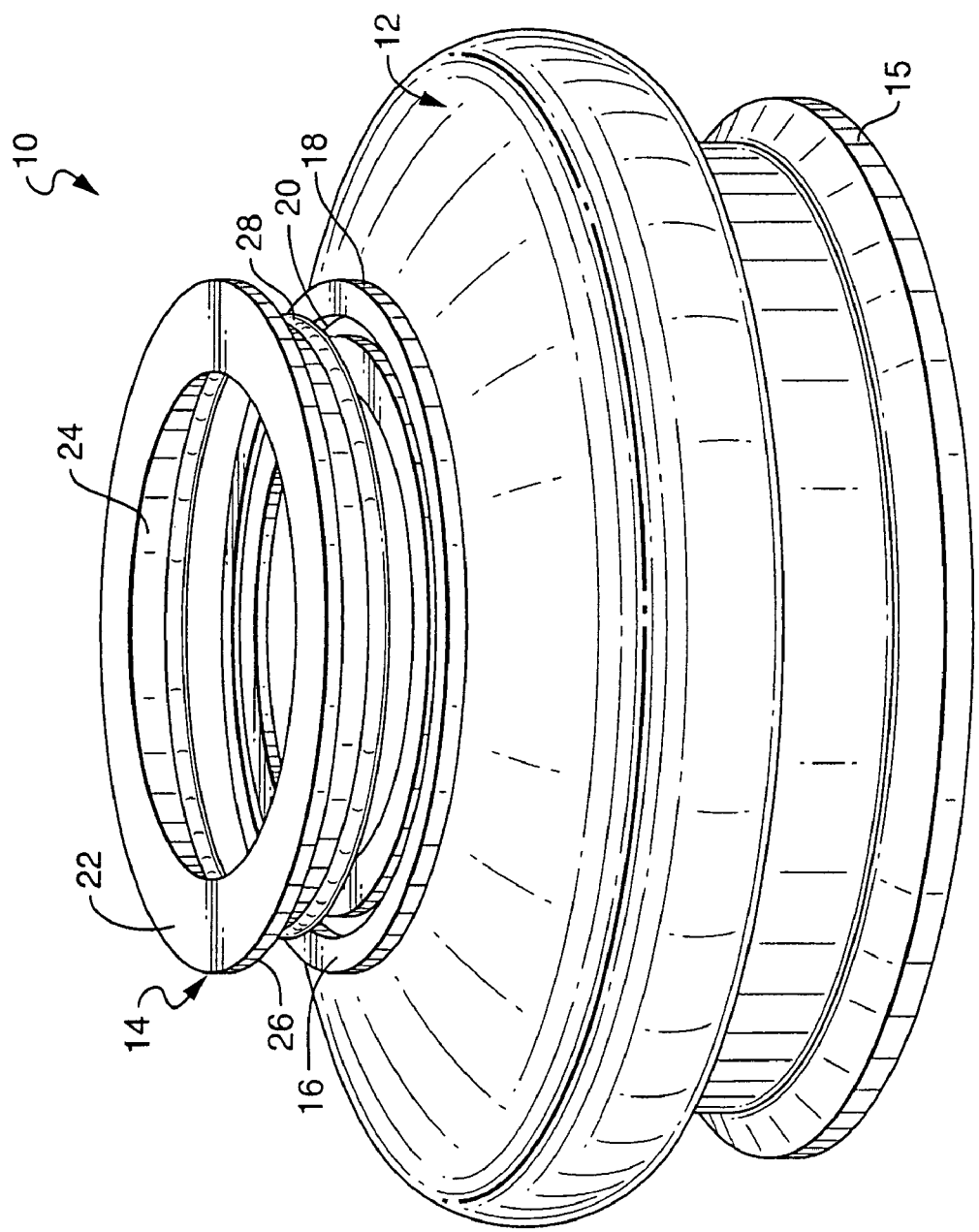
FIG. 1 is an exploded view of the boot seal and slipping ring assembly according to the invention.

Referring to the drawings in particular, the invention comprises a bellows seal arrangement or boot seal arrangement generally designated 10. The boot seal arrangement 10 includes a boot seal 12 and a snap in slipping ring or bellows seal element 14. The boot seal 12 has a housing end 15 and a connection piece end 18. The connection piece end 18 has an annular surface 16 with an annular guiding groove 20. The slipping ring 14 has a connection piece engagement portion with surface 22 and opposite boot seal engaging surface 26. The slipping ring 14 also has a sliding ring portion 28.

Figure 2:
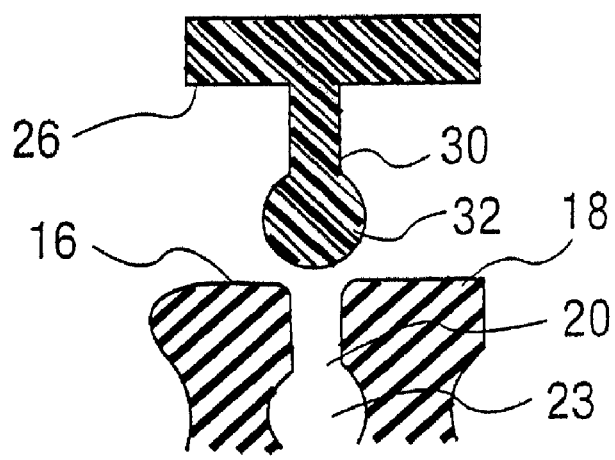
FIG. 2 is an exploded sectional view showing a detail of the assembly of FIG. 1.
Figure 3:
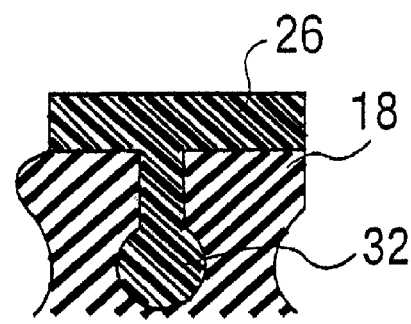
FIG. 3 is a sectional view showing the structure of FIG. 2A in an assembled state.

FIG. 2 shows the sealing ring 14 with boot sealing engaging surface 26 in a position ready to be seated in contact with sealing boot surface 16. The sliding ring portion 30 snaps into the guiding groove 20 with widened portion 32 passing through a narrow entranceway 64 into widened portion 23 of guiding groove 20. FIG. 3 shows the sliding ring portion 30 snapped into the dining groove 20.

Figure 4:
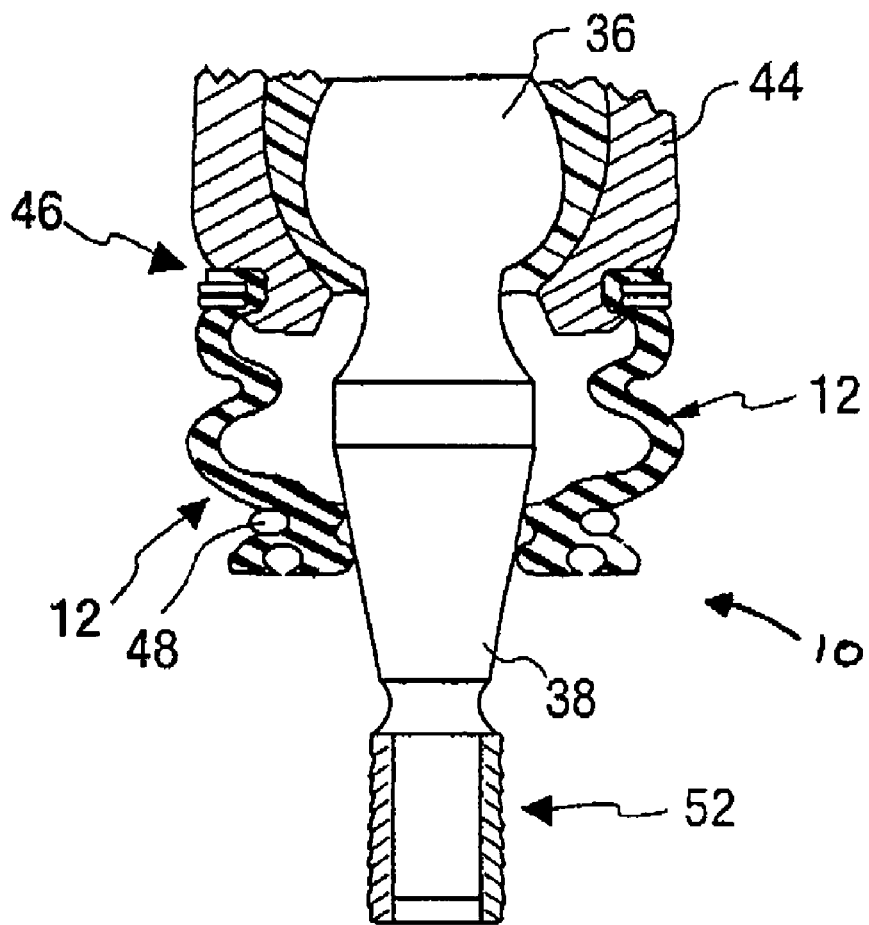
FIG. 4 is a partial sectional view of a ball joint ball and pin seated in a housing connected to a bellows (sealing boot)

The boot seal arrangement 10 is advantageously used with a ball and socket joint including ball 36 with pin 38 as shown in FIG. 4. The ball 36 is seated in a housing 44 (via intermediate bearing insert). The pin 38 is connected to a connecting piece or knuckle 40. The sealing boot 12 is connected at end 15 to the housing 44 via a clamping ring 46. The end 18 of sealing boot 12 is connected to the pin 38 by a clamping ring 48. The clamping ring 48 may be omitted as discussed further below.

Figure 5:
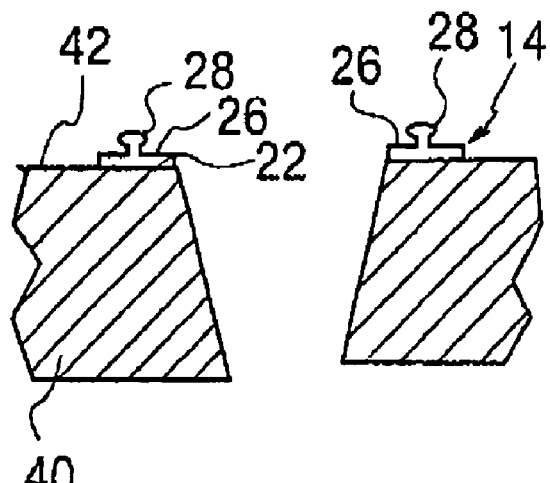
FIG. 5 is a sectional view showing a connection piece (knuckle) with a slipping ring attached to an upper surface thereof.

FIG. 5 shows the knuckle 40 with a sealing boot facing surface 42. The slipping ring surface 22 is positioned on the surface 42 to form a seal between the slipping ring surface 22 and knuckle 40 based on a soft gripping material coating (e.g. rubber) at the surface 22 or by the use of a sticky material such as an adhesive (e.g. contact glue).

Figure 6A:
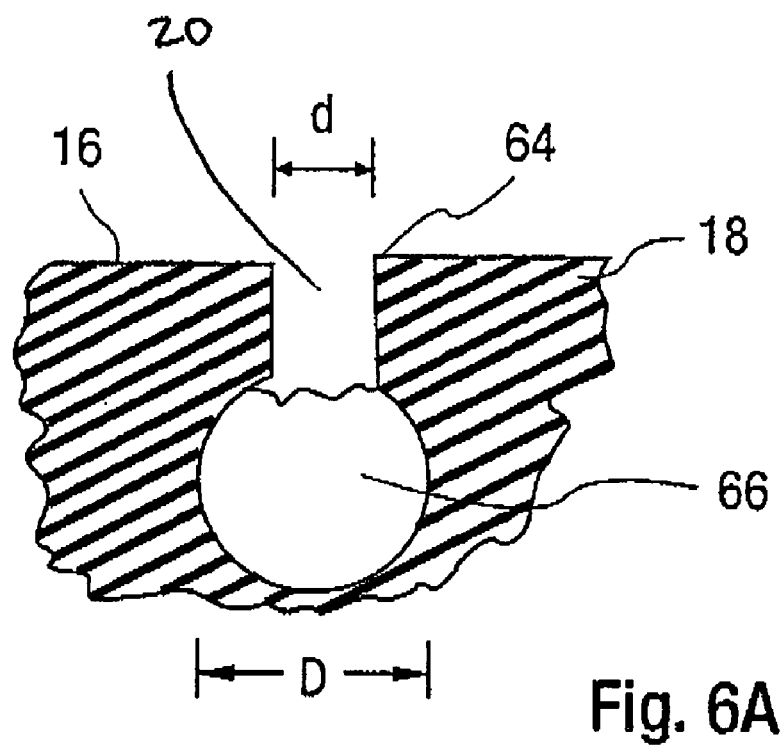
FIG. 6A is a sectional view of a knuckle facing side of the sealing boot with lubricant in a guiding groove.

The guiding groove 20 may be provided with a lubricant 66 as shown in FIG. 6A. This may be supplied in a preassembled state with the lubricant 66 already in position.

Figure 6B:
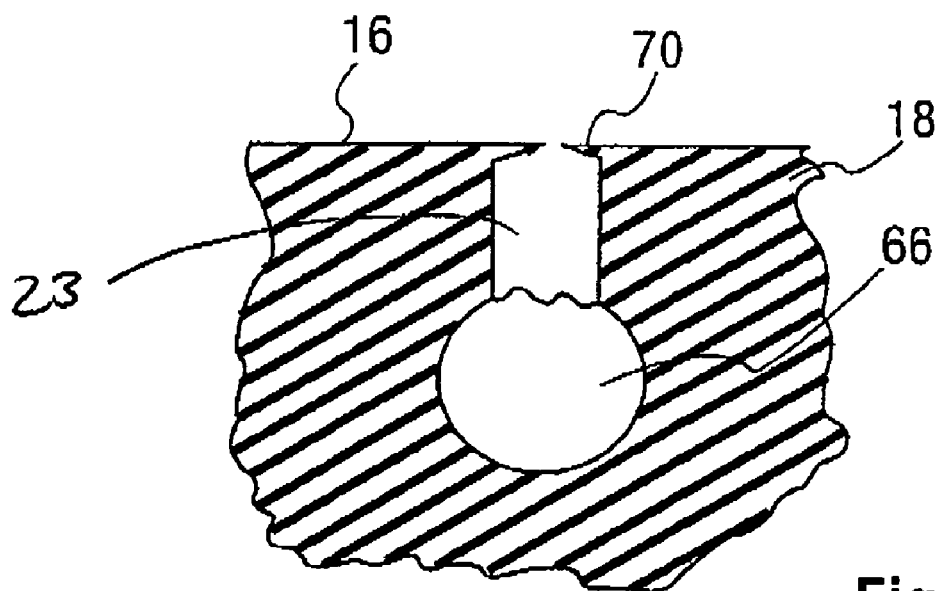
FIG. 6B is a sectional view of an alternative embodiment of the sealing boot, with the flaps or a membrane limiting the entrance to the guiding groove having lubricant therein.

The guide groove 20 may have an advantageous ratio of the width d of the opening 64 to the width D of the widened portion 23. With a sufficiently small dimension d, the lubricant may be substantially retained in the space 23, even during shipping and handling. Further, a film may be applied over the gap 64 during shipping and handling. Further, according to an alternative embodiment according to FIG. 6B, flaps 70 or a film or membrane thickness of material 70 is integrally formed with the sealing boot 12. In this case the lubricant 66 is injected through the membrane 70 or passes through a gap in the flaps 70.

FIG. 7A-7C show the assembly process in which a tapered surface of the pin 38 is seated in contact with the tapered surface of the knuckle 40. In FIG. 7A the surface 16 is positioned over the surface 26 and the gap 64 is aligned with the ring 30 (see also FIG. 8A). The ring 30 snaps into guiding groove 20 and the pin or stud 38 is advanced as shown in FIG. 7B. With the movement of the stud 38 into a seated position in three opening of the knuckle 40 the sealing boot 12 applies force toward the knuckle 40. Some amount of lubricant 66 may exit the space 23 for reducing friction for relative slip between sealing boot 12 and slipping ring 14 and for improving sealing characteristics. As shown in FIG. 8C, a good seal is provided based on the water ingress path 55 passing through to oil barriers 66.

FIG. 9A-9C show the assembly process in which a tapered surface of the pin 38 is seated in contact with the tapered surface of the knuckle 40 for an alternate embodiment. In the embodiment of FIGS. 9A-C no clamping ring is used at sealing boot end 18. Instead, the snap in connection between the sealing boot 12 and the slipping ring 14 as well as the geometry of the arrangement is such that the ring 30 grasps the sealing boot 12 and applies a radial force sufficient to replace the clamping ring. The length of the ring 30 may be a bit longer to provide a varied degree of radial pressure. The shape of the widened portion 32 may be varied for different properties such as maintaining more lubricant in the region of widened portion 32, in order to apply more radial pressure or to provide different fit aspects (snap fit). In FIG. 9A the surface 16 is positioned over the surface 26 and the gap 64 is aligned with the ring 30. The ring 30 snaps into guiding groove 20 and the stud 38 is advanced as shown in FIG. 9B. With the movement of the stud 38 into a seated position in the opening of the knuckle 40 the sealing boot 12 applies force toward the knuckle 40. Some amount of lubricant 66 will exit the space 23, reducing friction for relative slip between sealing boot 12 and slipping ring 14 and improving sealing characteristics. The water ingress path is again through two oil barriers 66. FIG. 9C shows the assembled position with the pin 38 bearing on the engagement surface 24, the bellows 12 applying force from an upper direction toward the surface 26 and the ring 30 cooperating to retain the bellows end 18 in the assembled position.

While specific embodiments of the invention have been shown and described in detail to illustrate the application of the principles of the invention, it will be understood that the invention may be embodied otherwise without departing from such principles.

What is claimed is:

1. A ball and socket joint bellows seal, comprising:
   a ball pivot pin with a connection piece;
   a bellows with an annular engagement surface with a sliding ring groove, wherein said annular engagement surface includes a pair of flaps monolithically formed with said bellows to define a material barrier preventing leakage at an entrance of said ring groove, said sliding ring groove having a widened portion spaced axially inwardly of said engagement surface;

a bellows seal element having a T-shaped cross section with a connection piece sealing face of a radially extending sealing portion statically with said connection piece and a sliding ring portion connected to said radially extending sealing portion and extending into said sliding ring groove;

lubricant disposed in said sliding ring groove, said engagement surface having a lubricant retaining portion defined by one of a narrowed gap and a material barrier at an entrance of said sliding ring groove, said lubricant retaining portion acting to retain at least a portion of said lubricant in said sliding ring groove in a pre-assembly state prior to said sliding ring portion being inserted into said widened portion of said sliding ring groove and to form a seal in a state with said sliding ring portion inserted into said widened portion of said sliding groove with an amount of lubricant at each of two sealing sides of said widened portion.

2. A bellows seal according to claim 1, wherein said radially extending sealing portion provides a static engagement with said connection piece to provide an axial seal and said sliding ring portion slides in said ring groove in an assembled state.

3. A bellows seal according to claim 2, wherein said radially extending sealing portion is fixed to said connection piece.

4. A bellows seal according to claim 2, wherein said sliding ring portion has a widened portion spaced axially inwardly of said radially extending sealing portion.

5. A bellows seal according to claim 4, wherein said annular engaging surface extends substantially in a radial direction with respect to said connection piece.

6. A bellows seal according to claim 1, wherein said bellows seal element has a pivot pin sealing surface engaged with said pivot pin.

7. A bellows seal according to claim 1, further comprising a clamping ring acting on an outside of said bellows to apply force to said bellows such that said pivot pin sealing surface statically engages with said pivot pin.

* * * * *